US012719960B2

(12) United States Patent
Antinori et al.

(10) Patent No.: US 12,719,960 B2
(45) Date of Patent: Aug. 25, 2026

(54) GENERATING EFFORTS TO FACILITATE PREPARATION AND EXECUTION OF SOFTWARE MIGRATIONS

(71) Applicant: RED HAT, INC., Raleigh, NC (US)

(72) Inventors: Paolo Antinori, Novara (IT); Marco Rizzi, Vicenza (IT)

(73) Assignee: Red Hat, Inc., Raleigh, NC (US)

( * ) Notice: Subject to any disclaimer, the term of this patent is extended or adjusted under 35 U.S.C. 154(b) by 112 days.

(21) Appl. No.: 18/468,990

(22) Filed: Sep. 18, 2023

(65) Prior Publication Data

US 2025/0097310 A1 Mar. 20, 2025

(51) Int. Cl.
*H04L 67/00* (2022.01)
*G06F 11/34* (2006.01)

(52) U.S. Cl.
CPC .......... *H04L 67/34* (2013.01); *G06F 11/3442* (2013.01)

(58) Field of Classification Search
CPC ............................. H04L 67/34; G06F 11/3442
USPC .......................................................... 709/203
See application file for complete search history.

(56) References Cited

U.S. PATENT DOCUMENTS 9,361,092 B1 6/2016 Bai et al.
10,812,346 B1 10/2020 Cross et al.
11,265,288 B2 3/2022 Branch et al.
11,392,561 B2 7/2022 Earnesty, Jr. et al.
2009/0254652 A1 10/2009 Binswanger et al.
2011/0173327 A1* 7/2011 Chen .................... G06F 9/5066 709/226
2013/0160008 A1* 6/2013 Cawlfield ........... G06F 9/45558 718/1
2014/0282456 A1* 9/2014 Drost ........................ G06F 8/76 717/158
2016/0224461 A1* 8/2016 Araya ................. G06F 11/3644
2019/0205479 A1* 7/2019 Zizka ...................... G06F 8/751
2020/0264919 A1* 8/2020 Vukovic ................ G06N 20/00
2021/0096853 A1* 4/2021 Aubert ...................... G06F 8/71

(Continued)

OTHER PUBLICATIONS

Li et al., "Building data-driven migration plans with application dependency discovery," AWS Cloud Operations & Migrations Blog, Sep. 27, 2022: pp. 1-3, <https://aws.amazon.com/blogs/mt/building-data-driven-migration-plans-with-application-dependency-discovery/>.

(Continued)

*Primary Examiner* — Suraj M Joshi
*Assistant Examiner* — Ayele F Woldemariam
(74) *Attorney, Agent, or Firm* — Kilpatrick Townsend & Stockton LLP

(57) ABSTRACT

A system can be provided for generating efforts to facilitate preparation and execution of software migrations. For example, the system can monitor software applications to generate metadata for the software applications. The system can also receive time-efforts for historical migrations of the software applications. The system can store the metadata and the time-efforts for the software applications in a database. Additionally, the system can receive, from a client device, an effort request associated with a migration of a software application. In response to receiving the effort request, the system can generate an effort for the migration of the software application based at least in part on the metadata and the time-efforts for the software applications. The system can then transmit the effort to the client device as a response to the effort request.

14 Claims, 3 Drawing Sheets

(56) References Cited

U.S. PATENT DOCUMENTS

| | | | | |
|---|---|---|---|---|
| 2021/0174280 | A1* | 6/2021 | Ratnapuri | G06Q 10/06315 |
| 2024/0329959 | A1* | 10/2024 | Barry | G06F 8/76 |

OTHER PUBLICATIONS

Maayan, "Application Dependency Mapping in Your Azure Migration Project," CloudBoost, Jan. 7, 2022: pp. 1-5, <https://blog.cloudboost.io/application-dependency-mapping-in-your-azure-migration-project-fbe7923e4725>.

* cited by examiner

GENERATING EFFORTS TO FACILITATE PREPARATION AND EXECUTION OF SOFTWARE MIGRATIONS

TECHNICAL FIELD

The present disclosure relates generally to software migrations and, more particularly (although not necessarily exclusively), to generating efforts to facilitate preparation and execution of software migrations.

BACKGROUND

Software developers can continue to develop and provide updates for (e.g., new versions of) software over time. For example, developers may provide updates over time that add features to the software or remove existing features from the software. New software may also be created that has similar functionality to older software. A user may wish to replace the existing software in a computing environment with such updates or new software. Thus, software migration can involve switching from a first piece of software to a second piece of software in a computing environment. In some cases, the first piece of software and the second piece of software can be different versions of the same piece of software.

Software migration can also involve transferring software applications, data associated with the software applications, or components of the software applications from one computing environment to another. For example, a software application can be transferred from an older system to a newer system or can be transferred from a first platform to a second platform (e.g., from an on-premise platform to a cloud computing platform). Additionally, the software applications often rely on other programs to perform tasks of the software application. The other programs, which may be a single file or a library of files, can be referred to as dependencies of the software application. Thus, software migrations may further involve transferring or upgrading dependencies of the software applications.

DETAILED DESCRIPTION

Figure 1:
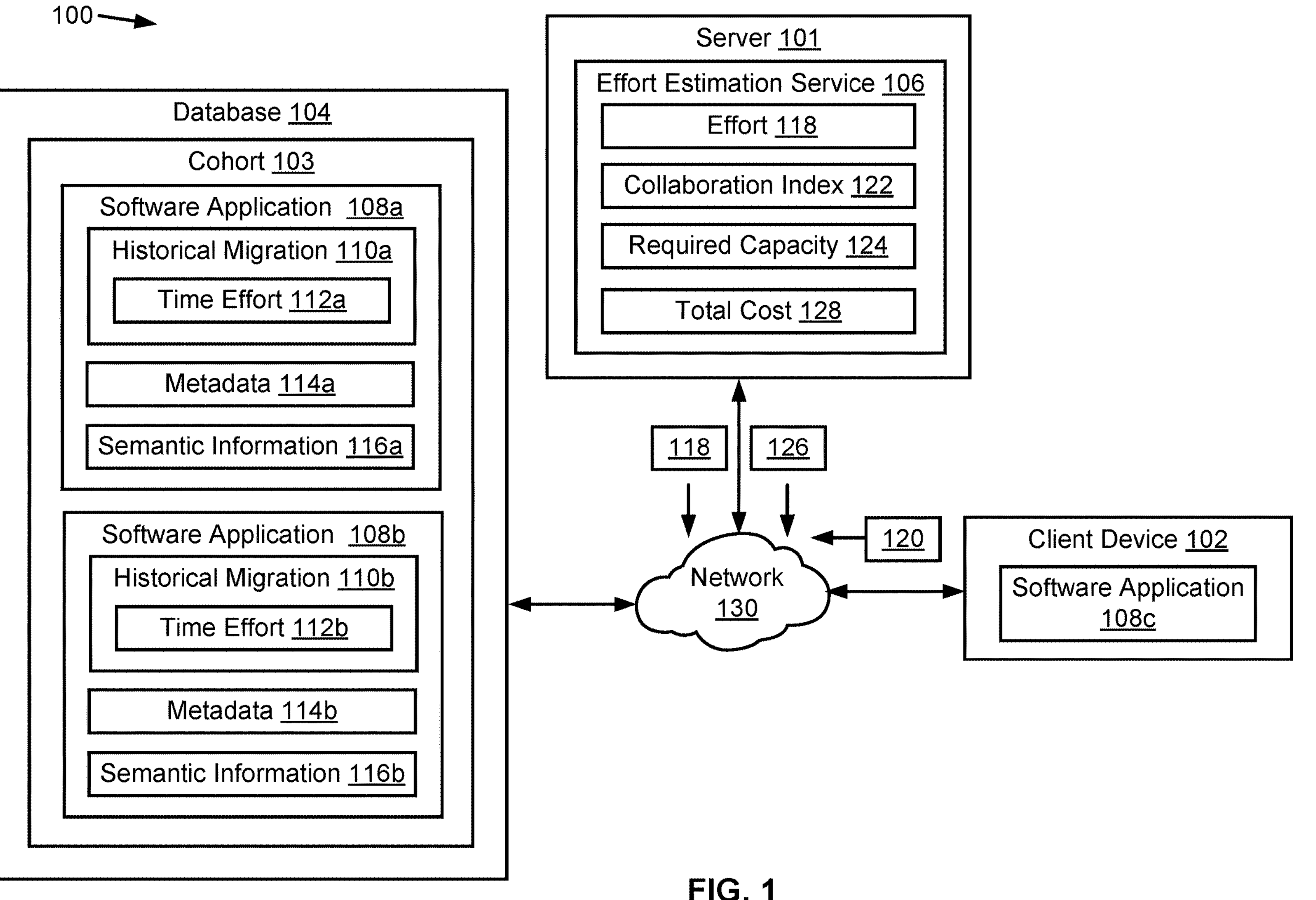
FIG. 1 is a block diagram of an example of a system for generating an effort to facilitate preparation and execution of a software migration according to one embodiment of the present disclosure.

Software migration can be complex and time-consuming due to a variety of challenges associated with transferring or updating software applications. For example, migrating a software application can disrupt or cause downtime for the execution of the software application. Migrating the software application can also cause the software application to be at risk for security breaches or data loss. Additionally, there can be compatibility issues if, for example, a new version of the software application is not compatible with hardware, an operating system, or other software of the computing environment in which the software application is executing. To minimize downtime, data loss, and other undesirable affects associated with software migrations, users can prepare for and plan a software migration prior to performing the software migration. To do so, current systems may determine an effort of a software migration. The effort can be a scalar or vector indicative of an amount of work, time, and resources required to successfully transfer a software application from one system to another, update the software application, or execute another suitable type of software migration. To determine the effort, the current systems may implement a set of migration rules, which may be generated manually by a software developer. The set of migration rules can be a set of static heuristics defining known patterns of software applications. Additionally, the set of migration rules can provide effort estimates for each of the known patterns.

Thus, a current approach to determining an effort for migrating a software application can involve the current systems inspecting the software application for known patterns using the set of migration rules. Then, for each known pattern detected, a corresponding effort estimate can be determined based on the set of migration rules. The corresponding effort estimates can be summed to determine an overall effort for the migration of the software application. However, the current approach cannot account for aspects of the software application that are not associated with the set of migration rules. For example, if the current system does receive a migration rule for a particular library used in the software application, the overall effort will not account for transferring or updating the particular library. As a result, the current systems can provide inaccurate or unreliable efforts. Thus, it can be desirable to develop a more efficient, scalable, and accurate approach to determining efforts for software migrations.

Some examples of the present disclosure can overcome one or more of the abovementioned problems by providing a software service that can continuously monitor various software applications and can predict efforts based on the monitored software applications. In addition to monitoring the software applications, the software service can receive information, such as time-efforts or challenges associated with previous migrations for the various software applications, from software developers. By continuously monitoring and receiving information for the various software applications, the software service can execute a dynamic and comparative approach to predicting efforts.

For example, to predict an effort for a migration of a software application, the software service can monitor and analyze one or more software applications similar to the software application. Then, the software service can predict the effort for the migration of the software application based on the analysis and based on the information (e.g., the time-efforts and challenges of previous migrations) for the similar software applications. In this way, the software service can predict an effort based on a variety of concrete data and information rather than a manually generated set of migration rules. The software service may also detect a level of affinity between the software application being migrated and each of the similar software applications being monitored. Then, an impact of the analysis and information for each of the similar software applications on the effort predicted can be weighted based on the level of affinity of each similar software application to the software application being migrated. In this way, the software service can produce an effort that accurately reflects the required time, resources, etc. for the migration of the software application.

The software service can also more accurately predict the efforts due to the software service continuously receiving and learning from the monitored software applications and the information from software developers. The software service can further predict efforts more efficiently than current systems. For example, rather than requiring a software developer to manually generate a set of migration rules, which can be time consuming, the software service can automatically analyze software applications and use the information from software developers to predict efforts.

In a particular example, a software application can currently use version A of a dependency. It can be desirable for the software application to be upgraded to using a version B of the dependency. To do so, a software service can be monitoring one or more software applications with the dependency. The software service can generate metadata for each of the monitored software applications, which may indicate which version (e.g., version A or version B) of the dependency each of the monitored software applications includes. The software service can also receive time-efforts associated with historical migrations of each of the monitored software applications.

Due to it being desirable to upgrade the dependency, the software service can receive, from a client device, an effort request. The effort request can be a request for an estimation of an effort for upgrading the dependency of the software application from version A to version B. The metadata generated by the software service may indicate that a particular software application of the monitored software applications has been upgraded to include version B. Additionally, as part of the time-efforts received, the software service can include a particular time-effort for the upgrade of the particular software application to include version B. The particular time-effort can indicate an amount of time used for the upgrade of the particular software application. The software service may also receive additional information for the upgrade of the particular software application such as a required capacity (e.g., an amount of computational resources used). Thus, in response to receiving the effort request, the software service can produce the estimate of the effort for upgrading the dependency of the software application based on the metadata, the time-effort, and the additional information. The software service can then transmit the effort to the client device. The effort may be used by a user of the client device to plan the upgrade to the dependency from version A to version B.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for generating an effort 118 to facilitate preparation and execution of a software migration according to one embodiment of the present disclosure. The system 100 can include a server 101 in communication with a database 104 and a client device 102. Each of these components may be local to or remote from each other. The server 101 can include an effort estimation service 106, or the effort estimation service 106 may be remote from and accessible by the server 101. The server 101 may communicate with the database 104, the effort estimation service 106, or the client device 102, over a network 130, such as a local area network (LAN) or the internet.

The effort estimation service 106 of the server 101 can monitor software applications. For example, the effort estimation service 106 can be monitoring a first software application 108*a* and a second software application 108*b*. A user may indicate to the effort estimation service 106 which software applications to monitor. The user may further define, via the effort estimation service 106, cohorts of related software applications. The cohorts can be groups software applications with the same or similar dependencies, groups of software applications executing in the same or similar computing environments, or other suitable groups of related software applications. For example, the user may define a cohort 103 of the first software application 108*a* and the second software application 108*b* based on the software applications 108*a-b* performing the same or similar tasks.

The effort estimation service 106 can further maintain, communicate with, or a combination thereof the database 104, which includes data obtained by the effort estimation service 106 while monitoring with the software applications 108*a-b*. For example, in monitoring the software applications 108*a-b*, the effort estimation service 106 may generate first metadata 114*a* for the first software application 108*a* and second metadata 114*b* for the second software application 108*b*. The metadata 114*a-b* can include information such as descriptions of the software applications 108*a-b*, dependencies associated with the software applications 108*a-b*, version information for the software applications 108*a-b*, file sizes for the software applications 108*a-b*, etc.

Additionally, the effort estimation service 106 can receive time-efforts 112*a-b* for historical migrations 110*a-b* of the software applications 108*a-b*. A time-effort can be an amount of time required to successfully perform a software migration. The effort estimation service 106 may receive the time-efforts 112*a-b* from software developers or other suitable users associated with the software applications 108*a-b*. In a particular example, a first historical migration 110*a* of the first software application 108*a* may have involved transferring a runtime of the first software application 108*a* from a first computing environment to a second computing environment. Thus, a first time-effort 112*a* received by the effort estimation service 106 can be an amount of time, as experienced by a software developer, to perform the transfer of the runtime from the first computing environment to the second computing environment. Additionally, in the particular example, a second time-effort 112*b* can be an amount of time used to perform a second historical migration 110*b* of the second software application 108*b*. The second historical migration 110*b* may have involved upgrading the second software application 108*b* from a first version to second version.

The effort estimation service 106 can also receive semantic information describing one or more challenges of or providing advice based on the historical migrations 110*a-b* of the software applications 108*a-b*. In the particular example, first semantic information 116*a* may indicate security vulnerabilities of the second computing environment or other suitable challenges associated with the first historical migration 110*a*. Similarly, second semantic information 116*b* may provide code required for the second version of the second software application that is not available in the first software application 108*a* or may indicate challenges of the second historical migration 110*b*.

The effort estimation service 106 can store the metadata 114*a-b*, the time-efforts 112*a-b*, the semantic information 116*a-b*, or a combination thereof in the database 104. Additionally, the database 104 can be organized based on the cohorts. Thus, the metadata 114*a-b*, the time-efforts 112*a-b*, the semantic information 116*a-b*, or the combination thereof of the related software applications 108*a-b* of the cohort 103 can be stored together within the database 104. Moreover, the effort estimation service 106 can continuously receive the time-efforts 112*a-b* and the semantic information 116*a-b*, can continuously generate or update the metadata 114*a-b*, or a combination thereof. In this way, the effort estimation service 106 can continuously increase the data and other suitable information available for predicting efforts and can continuously learn from the software applications being monitored. As a result, the effort estimation service 106 can predict efforts for a variety of software migrations. Additionally, as a result, the effort estimation service 106 can predict efforts with high accuracy.

The effort estimation service 106 can further receive, from the client device 102, an effort request 120. The effort request 120 can be a request for an effort 118 for a migration of a third software application 108*c*. The migration of the third software application 108*c* can involve transferring a runtime of the third software application 108*c* from the first computing environment to the second computing environment. In some examples, the effort request 120 may indicate one or more software applications related to the third software application 108*c*. For example, the effort request 120 may indicate that the cohort 103 of software applications 108*a-b* is related to the third software application 108*c*. The effort estimation service 106 can then analyze the software applications 108*a-b* of the cohort 103 as part of generating the effort 118 for the migration of the third software application 110*c*.

Alternatively, in response to the effort request 120, the effort estimation service 106 may automatically detect the software applications 108*a-b* or the cohort 103 related to the third software application 108*c*. For example, the effort estimation service 106 can detect one or more similarities between the software applications 108*a-b* and the third software application 108*c*. To do so, the effort estimation service 106 may analyze the metadata 114*a-b*, semantic information 116*a-b*, historical migrations 110*a-b*, or a combination thereof to determine that the software applications 108*a-b* are related to the third software application 108*c*. In the particular example, the effort estimation service 106 can detect that the first historical migration 110*a* involved the same computing environments as the migration included in the effort request 120. The effort estimation service 106 may also detect, based on the second metadata 114*b*, that the second software application 108*b* involves one or more dependencies that are also used in the third software application 108*c*.

Additionally, in response to receiving the effort request 120, the effort estimation service 106 may generate the effort 118 for the migration of the third software application 108. For example, the effort estimation service 106 can generate the effort 118 based on the time-efforts 112*a-b*, the semantic information 116*a-b*, or a combination thereof. In the particular example, the effort 118 may be largely generated based on the first time-effort 112*a* and the first semantic information 116*a* due to the first historical migration 110*a* involving the first computing environment and the second computing environment. The effort 118 may also generated based on the second metadata 114*b*, second time-effort 112*b* and the second semantic information 116*b* due to the second software application using the one or more dependencies that are also used in the third software application 108*c*.

The effort estimation service 106 can further generate the effort 118 based on the metadata 114*a-b* by using the metadata 114*a-b* to determine an affinity of each of the software applications 108*a-b* to the third software application 108*c*. The affinity can be based on a number of similarities between the software applications 108*a-b* and the third software application 108*c* or a relevancy of the similarities to the migration of the third software application 108*c*. The effort estimation service 106 may weight an impact of the time-efforts 112*a-b*, the semantic information 116*a-b*, or the like on the generation of the effort 118 based on the affinity of each of the software applications 108*a-b* to the third software application 108*c*.

In some examples, the effort estimation service 106 can further generate a collaboration index 122 indicative of the affinity of the third software application 108*c* to the software application 108*a-b*. In a first example, the collaboration index 122 can be a single value indicative of the affinity of the third software application 108*c* to the software applications 108*a-b* used in generating the effort 118. In this way, the collaboration index 122 can be indicative of an accuracy or quality of the effort 118 generated. In another example, multiple collaboration indexes 122 can be generated based on an affinity of the third software application 108*c* to each of the software applications 108*a-b*.

The effort 118 generated can be a scalar or vector indicative of an amount of work, time, and resources required to successfully transfer the runtime of the third software application 108*c* from the first computing environment to the second. In an example in which the effort 118 is a scalar, a greater effort can be associated the migration (e.g., the transfer the runtime of the third software application 108*c* from the first computing environment to the second computing environment) requiring more time, resources, and work. In an example in which the effort 118 is a vector, the effort 118 can include various components indicative of different aspects of the migration of the third software application 108*c*. For example, components of the vector for the effort 118 can provide an estimation of an amount of computational resources required for the migration, an estimation of time required for the migration, an estimation of a number of code line changes for the migration, or other suitable metrics associated with the migration of the third software application 108*c*.

The effort 118 can be transmitted to the client device 102 in response to the effort request 120. The effort 118 can be used to plan, predict a required capacity 124 of, predict a total cost 128 of, or a combination thereof the migration of the third software application 108*c*. In some examples, the effort estimation service 106 can predict the required capacity 124, the total cost 128, or a combination thereof and may transmit the required capacity 124, the total cost 128, or the combination thereof to the client device 102. In other examples, a user of the client device 102 can predict the required capacity 124, the total cost 128, or the combination thereof based on the effort 118. The required capacity 124 can be an estimation of an amount of or a type of computational resources required for the migration of the third software application 108*c*. The total cost 128 can be an estimated downtime for the third software application 108*c* or other suitable cost associated with migrating the third software application 108*c*.

The effort estimation service 106 can also generate a report 126 comprising the effort 118, the metadata 114*a-b*, the semantic information 116*a-b*, the time-efforts 112*a-b*, or a combination thereof. The report 126 can be transmitted to the client device 102. In this way, the effort estimation service 106 can provide details of the generation of the effort 118 and other suitable useful information to further assist the user of the client device 102 with to planning, predicting the required capacity 124 of, predicting the total cost 128 of, or a combination thereof the migration of the third software application 108*c*.

FIG. 1 is illustrative and non-limiting. Other examples may include more components, fewer components, different components, or a different arrangement of the components shown in FIG. 1. For example, although the server 101 includes the effort estimation service 106 in the example of FIG. 1, the effort estimation service 106 may be external to the server 101 in other examples. Additionally, the database 104 may be local to the server 101 in other examples.

Figure 2:
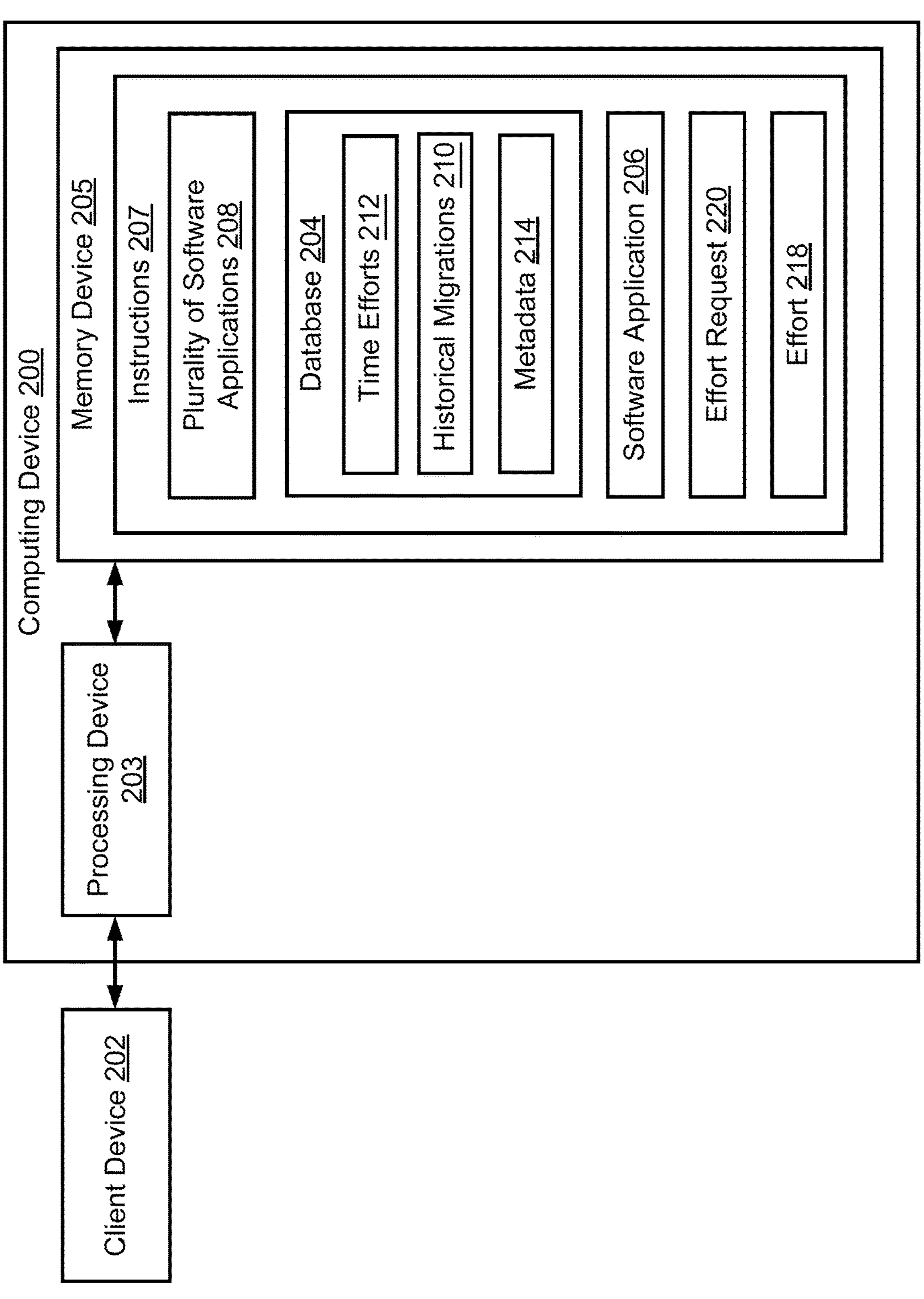
FIG. 2 is a block diagram of an example of a computing device for generating an effort to facilitate preparation and execution of a software migration according to one embodiment of the present disclosure.

FIG. 2 is a block diagram of an example of a computing device 200 for generating an effort to facilitate preparation and execution of a software migrations according to one embodiment of the present disclosure. The computing device 200 includes a processing device 203 that is communicatively coupled to a memory device 205. The processing device 203 and the memory device 205 may be part of the server 101 in FIG. 1.

The processing device 203 can include one processing device or multiple processing devices. Non-limiting examples of the processing device 203 include a Field-Programmable Gate Array (FPGA), an application-specific integrated circuit (ASIC), a microprocessor, etc. The processing device 203 can execute instructions 207 stored in the memory device 205 to perform operations. The instructions 207 may include processor-specific instructions generated by a compiler or an interpreter from code written in any suitable computer-programming language, such as C, C++, C#, etc.

The memory device 205 can include one memory or multiple memories. The memory device 205 can be non-volatile and may include any type of memory that retains stored information when powered off. Non-limiting examples of the memory device 205 include electrically erasable and programmable read-only memory (EEPROM), flash memory, or any other type of non-volatile memory. At least some of the memory device 205 can include a non-transitory computer-readable medium from which the processing device 203 can read instructions 207. A computer-readable medium can include electronic, optical, magnetic, or other storage devices capable of providing the processing device 203 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 207.

In some examples, the processing device 203 can execute the instructions 207 to perform operations. For example, the processing device 203 can monitor a plurality of software applications 208 to generate metadata 214 for each software application of the plurality of software applications 208. The processing device 203 can also receive at least one time-effort 212 for at least one historical migration 210 of each software application of the plurality of software applications 208. The processing device 203 can store the metadata 214 for each software application of the plurality of software applications 208 and the at least one time-effort 212 for the at least one historical migration 210 of each software application of the plurality of software applications 208 in a database 204. Additionally, the processing device 203 can receive, from a client device 202, an effort request 220 associated with a migration of a software application 206. In response to receiving the effort request 220, the processing device 203 can generate an effort 218 for the migration of the software application 206 based at least in part on the metadata 214 for each software application of the plurality of software applications 208 and on the at least one time-effort 212 for the at least one historical migration 210 of each software application of the plurality of software applications 208. The processing device 203 can further transmit the effort 218 to the client device 202 as a response to the effort request 220.

Figure 3:
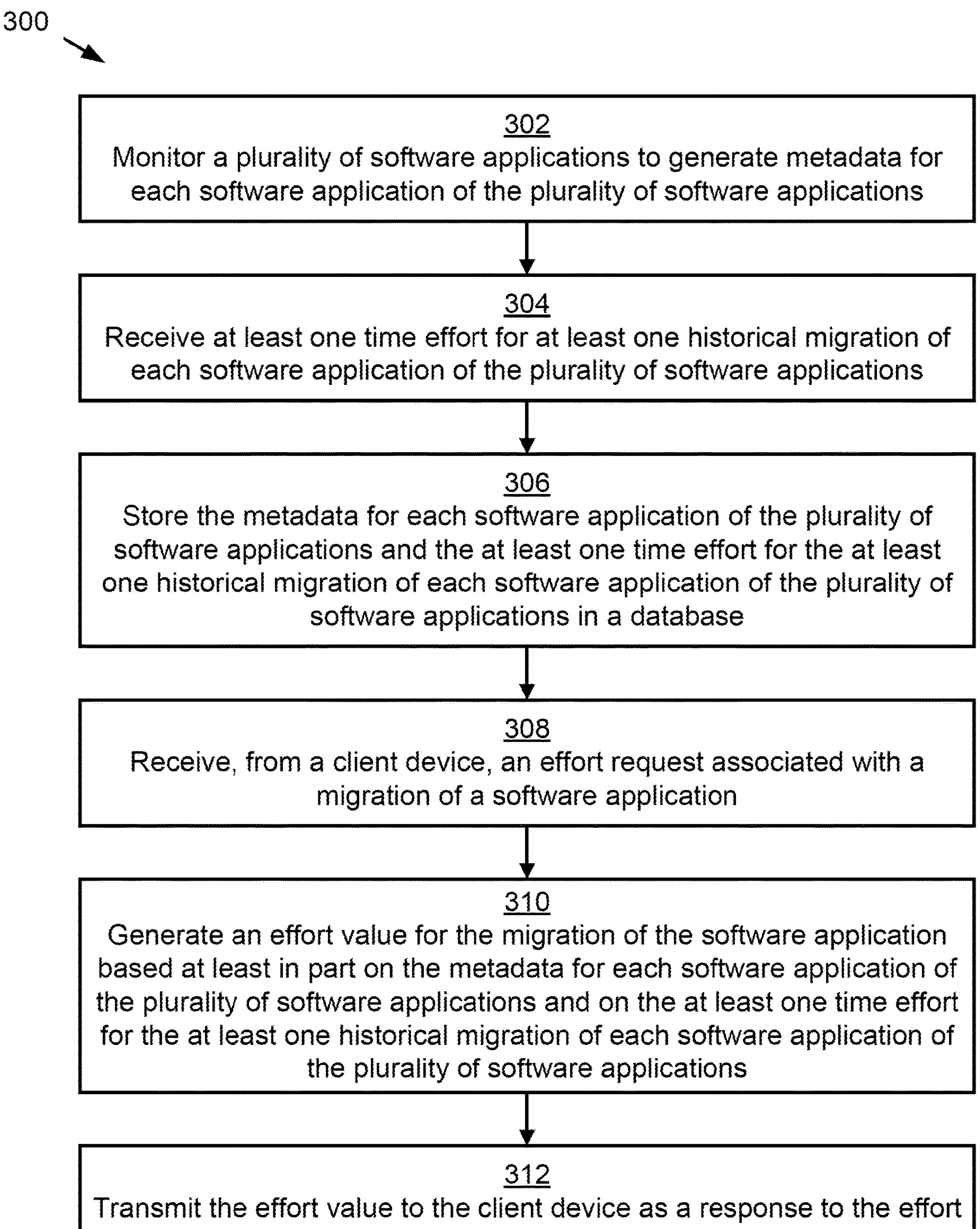
FIG. 3 is a block diagram of an example of a process for generating an effort to facilitate preparation and execution of a software migration according to one embodiment of the present disclosure.

FIG. 3 is a block diagram of an example of a process 300 for generating an effort to facilitate preparation and execution of a software migration according to one embodiment of the present disclosure. The processing device 203 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 1-2.

At block 302, the processing device 203 can monitor a plurality of software applications 208 to generate metadata 214 for each software application of the plurality of software applications 208. The processing device 203 may receive an instruction from a client device 202 to monitor the software applications 208. The client device 202 may further indicate to the processing device 203 that the software applications 208 are related to cause the processing device 203 to generate a cohort that includes the software applications 208. The metadata 214 can include information such as a description of each of the software applications 208, dependencies associated with each of the software applications 208, version information for each of the software applications 208, and file sizes for each of the software applications 208.

At block 304, the processing device 203 can receive at least one time-effort 212 for at least one historical migration 210 of each software application of the plurality of software applications 208. For example, the software applications 208 may each be upgraded from a first version to a second version. Thus, the historical migrations 210 can be the upgrades to the software applications 208 and the time-efforts 212 can be an amount of time used to perform each upgrade to each of the software applications 208.

At block 306, the processing device 203 can store the metadata 214 for each software application of the plurality of software applications 208 and the at least one time-effort 212 for the at least one historical migration 210 of each software application of the plurality of software applications 208 in a database 204. In this way, the metadata 214 and time-effort 212 can be accessible to the processing device 203. Additionally, in some examples, the database 204 can be organized based on cohorts (e.g., groups of related software applications) defined by a user of the client device 202. Thus, the metadata 214 and the time-efforts 212 can be stored together within the database 204.

At block 308, the processing device 203 can receive, from the client device 202, an effort request 220 associated with a migration of a software application 206. The effort request 220 can be a request for an effort 218 for the migration of the software application 206. The migration of the software application 206 can involve upgrading the software application 206 from a first version to a second version. The software applications 208 can be related to the software application 206 due to having similar dependencies as the software application 206. Thus, there can be similarities between the historical migrations 210 of the software applications 208 (e.g., the upgrades of the software applications 208 from the first version to the second version) and the migration of the software application 206.

At block 310, the processing device 203 can generate an effort 218 for the migration of the software application 206 based at least in part on the metadata 214 for the at least one software application and on the at least one time-effort 212 for the at least one historical migration 210 of the at least one software application 206. For example, the processing device 203 may detect a level of affinity between the between each of the software applications 208 and the software application 206 based on the metadata 214. For example, each dependency in common between each of the software applications 208 can increase the level of affinity. If for example, the level of affinity between the software application 206 and a particular software application of the software applications 208 is high, an impact of a corresponding time-effort of the time-efforts 212 on the effort 218 generated can be high. For example, if the corresponding time-effort indicates a significant amount of time and resources were required for the historical migration of the particular software application, the effort 218 may be increased to indicate that the migration of the software application 206 may also require significant time and resources.

At block 312, the processing device 203 can transmit the effort 218 to the client device 202 as a response to the effort request 220. The effort 218 can be used by the user of the client device 202 to plan, predict a required capacity of, predict a total cost of, or a combination thereof the migration of the software application 206. In some examples, the effort 218 can be transmitted as part of a report generated by the processing device 203. The report can include, in addition to the effort 218, the time-effort 212, the metadata 214, or other suitable information. The report can further assist the user in planning the migration of the software application 206. For example, if the effort 218 is high, the user can prepare for the migration of the software application 206 to take a significant amount of time.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device that includes instructions executable by the processing device for causing the processing device to perform operations comprising:
monitoring a plurality of software applications to generate metadata for each software application of the plurality of software applications;
receiving a time-effort for a historical migration of each software application of the plurality of software applications;
storing the metadata for each software application of the plurality of software applications and the time-effort for the historical migration of each software application of the plurality of software applications in a database;
receiving, from a client device, an effort request associated with a migration of a particular software application;
in response to receiving the effort request, for each software application of the plurality of software applications:
generating a collaboration index indicative of an affinity of the software application to the particular software application; and
generating a weighted time-effort by weighing the time-effort for the historical migration of the software application based on the collaboration index generated for the software application;
generating an effort for the migration of the particular software application based on the metadata for each software application of the plurality of software applications and on the weighted time-effort for the historical migration of each software application of the plurality of software applications; and
generating a report comprising the effort, the metadata for each software application of the plurality of software applications, and the weighted time-effort for the historical migration of each software application of the plurality of software applications; and
transmitting the report to the client device as a response to the effort request.

2. The system of claim 1, wherein the memory device further includes instructions executable by the processing device for causing the processing device to perform operations comprising:
receiving semantic information for the historical migration of each software application of the plurality of software applications, the semantic information describing one or more challenges associated with the historical migration of each software application of the plurality of software applications; and
storing the semantic information for the historical migration of each software application of the plurality of software applications in the database.

3. The system of claim 2, wherein the operation of generating the effort for the migration of the particular software application is further based on the semantic information for the historical migration of each software application of the plurality of software applications.

4. The system of claim 1, wherein the memory device further includes instructions executable by the processing device for causing the processing device to perform operations comprising:
predicting a required capacity and a total cost for the migration of the particular software application based on the effort.

5. The system of claim 1, wherein the memory device further includes instructions executable by the processing device for causing the processing device to perform operations comprising:
detecting one or more similarities between the particular software application and each software application of the plurality of software applications.

6. A method comprising:
monitoring a plurality of software applications to generate metadata for each software application of the plurality of software applications;
receiving a time-effort for a historical migration of each software application of the plurality of software applications;
storing the metadata for each software application of the plurality of software applications and the time-effort for the historical migration of each software application of the plurality of software applications in a database;

receiving, from a client device, an effort request associated with a migration of a particular software application;

in response to receiving the effort request, for each software application of the plurality of software applications:

generating a collaboration index indicative of an affinity of the software application to the particular software application; and generating a weighted time-effort by weighing the time-effort for the historical migration of the software application based on the collaboration index generated for the software application;

generating an effort for the migration of the particular software application based on the metadata for each software application of the plurality of software applications and on the weighted time-effort for the historical migration of each software application of the plurality of software applications; and generating a report comprising the effort. the metadata for each software application of the plurality of software applications, and the weighted time-effort for the historical migration of each software application of the plurality of software applications; and transmitting the report to the client device as a response to the effort request.

7. The method of claim 6, further comprising:

receiving semantic information for the historical migration of each software application of the plurality of software applications, the semantic information describing one or more challenges associated with the historical migration of each software application of the plurality of software applications; and storing the semantic information for the historical migration of each software application of the plurality of software applications in the database.

8. The method of claim 7, wherein generating the effort for the migration of the particular software application is further based on the semantic information for the historical migration of each software application of the plurality of software applications.

9. The method of claim 7, further comprising:

predicting a required capacity and a total cost for the migration of the particular software application based on the effort.

10. The method of claim 7, further comprising:

detecting one or more similarities between the particular software application and each software application of the plurality of software applications.

11. A non-transitory computer-readable medium comprising instructions that are executable by a processing device for causing the processing device to perform operations comprising:

monitoring a plurality of software applications to generate metadata for each software application of the plurality of software applications;

receiving a time-effort for a historical migration of each software application of the plurality of software applications;

storing the metadata for each software application of the plurality of software applications and the time-effort for the historical migration of each software application of the plurality of software applications in a database;

receiving, from a client device, an effort request associated with a migration of a particular software application;

in response to receiving the effort request, for each software application of the plurality of software applications:

generating a collaboration index indicative of an affinity of the software application to the particular software application; and generating a weighted time-effort by weighing the time-effort for the historical migration of the software application based on the collaboration index generated for the software application; and generating an effort for the migration of the particular software application based on the metadata for each software application of the plurality of software applications and on the weighted time-effort for the historical migration of each software application of the plurality of software applications; and generating a report comprising the effort, the metadata for each software application of the plurality of software applications, and the weighted time-effort for the historical migration of each software application of the plurality of software applications; and transmitting the report to the client device as a response to the effort request.

12. The non-transitory computer-readable medium of claim 11, further comprising instructions executable by the processing device for causing the processing device to perform operations comprising:

receiving semantic information for the historical migration of each software application of the plurality of software applications, the semantic information describing one or more challenges associated with the historical migration of each software application of the plurality of software applications; and storing the semantic information for the historical migration of each software application of the plurality of software applications in the database.

13. The non-transitory computer-readable medium of claim 12, wherein the operation of generating the effort for the migration of the particular software application is further based on the semantic information for the historical migration of each software application of the plurality of software applications.

14. The non-transitory computer-readable medium of claim 11, further comprising instructions executable by the processing device for causing the processing device to perform operations comprising:

predicting a required capacity and a total cost for the migration of the particular software application based on the effort.

* * * * *